United States Patent Office 2,710,807
Patented June 14, 1955

2,710,807

FOOD PRODUCTS CONTAINING GLUCOSIDES OF N-ACETYL-D-GLUCOSAMINE

Paul György, Villanova, Pa., and Richard Kuhn and Friedrich Zilliken, Heidelberg, Germany, assignors, by mesne assignments, to American Home Products Corporation, New York, N. Y., a corporation of Delaware No Drawing. Application May 27, 1952,
Serial No. 290,327

6 Claims. (Cl. 99—54)

This invention relates to food products and, more particularly, to food products which are suitable for use in the feeding of infants.

Our invention is more especially concerned with certain new and improved food compositions which contain the usual fat, protein, carbohydrate, fatty acid, amino acid, vitamin and mineral constituents necessary for growth of the infant, but which compositions also contain, in addition, a specific factor or principle necessary to support the growth of the microorganism Lactobacillus bifidus as the predominant microorganism in the digestive tract of the infant fed therewith.

Our invention also relates to the incorporation, in nutritive compositions and compositions having therapeutic activity, of substances which possess a high activity for promoting the growth of the microorganism Lactobacillus bifidus, and especially for promoting the growth of those strains of the microorganism, such as L. bifidus var. Penn., which do not normally grow unless specific growth-promoting principles are present and available to the microorganism. We have now discovered that the α- and β-alkyl glucosides of N-acetyl-d-glucosamine, more particularly alkyl glucosides such as the α- and β-methyl glucosides, α-ethyl glucoside, and α-isopropyl glucoside of N-acetyl-d-glucosamine, when incorporated in infant feeding preparations, or in compositions intended for therapeutic use or geriatric feeding, will promote the growth of Lactobacillus bifidus, and especially those strains such as L. bifidus var. Penn., in the intestinal tracts of persons who ingest such compositions.

There are a number of commercially available food compositions utilized for the feeding of infants which are based on cow's milk as an essential and important nutritive constituent thereof. These compositions generally contain, in addition to added vitamins, a fat constituent, milk protein, an edible sugar (frequently lactose), minerals, and ash. The relative proportion of these constituents is such as to provide a nutritive formula meeting all the nutritional requirements of the infant when an aqueous solution of a specified concentration is prepared and fed to the infant.

As an example, one well-known commercially available infant feeding formula, derived from cow's milk but having major physical and chemical properties essentially the same as human milk, contains approximately 1.5% of protein, 7.0% of carbohydrate, 3.5% of fat, 0.38% of ash and a mineral constituent, such as iron, present in a relatively minor amount as, for example, approximately 0.0005%, as the food is made up as a liquid ready to feed to the infant. Such a composition is, in many respects, similar to human milk, will supply approximately 20 calories per fluid ounce and contains of course, in addition, various vitamin constituents, such as vitamin A, thiamin, riboflavin, vitamin C, vitamin D and niacin, all present (with the exception of vitamin C) in amounts considerably in excess of the amounts in which those vitamins are present in an equal volume of human or breast milk.

It should be understood, of course, that the particular commercial food composition having the foregoing analysis is but one of many available infant feeding formulas, all based on, or derived from, cow's milk, which compositions are usually supplied, either in a concentrated liquid form which is adapted to be diluted with water before use, or as a solid powder or granular composition which is dissolved in water in specified proportions to provide solutions of specified concentrations. Such compositions will vary to some extent from each other in the ingredients utilized, i. e. the source of the fat present therein, the content of saturated and unsaturated fatty acids and amino acids, the carbohydrate constituents, the relative proportions of the ingredients, etc., but they are essentially similar in that all are derived from the milk of cows. While some of these commercially available infant food compositions are similar in their major physical and chemical properties and in greater or less degree to human or breast milk as supplied to a nursling by the lactating mother, there are certain important differences in the predominating microorganisms present in the intestinal bacterial flora characteristic of an infant fed exclusively on human or breast milk, as compared with the intestinal flora of an infant fed with one of the commercial food formulas based on, or derived from, cow's milk.

The intestinal flora of the breast fed infant is characterized by the presence therein of the microorganism Lactobacillus bifidus as the predominating microorganism. The stools of infants fed exclusively with human milk are in fact characterized by the presence of this microorganism as constituting almost the entire bacterial flora therein.

As seen in smears when freshly isolated from the infant feces, the L. bifidus organism comprises gram-positive, straight or curved rods that are non-motile and that do not form spores. One or both ends may appear to be split longitudinally to give the effect of two short branches, this appearance leading to the term "bifid." One end of the organism may be bulbous or racket-shaped.

While this microorganism predominates in the intestinal tract and feces of infants fed with human or mother's milk, it is not the characteristic or predominating microorganism in the intestinal tract of infants fed with other foods, such as cow's milk or with the commercially available food preparations derived from, or based on, cow's milk. Infants so fed show a less uniform intestinal flora with an appreciable proportion of gram-negative rods and cocci.

The fact that a stable L. bifidus flora is characteristic only of the intestinal tract of breast-fed infants is now fully understood and appreciated by pediatricians and other specialists in the medical, biological, and nutritional sciences. See, for example, the publications of Tissier, Comptes rendus soc. biol., 51, pages 943–945; and 60, pages 359–361; and Ann. inst. Pasteur, 19, pages 109–123; and 22, pages 189–207. See also the papers of Moro; Wien, klin. Wochschr.; 13, pages 114–115, and Jahrb. Kinderheilk., 61, pages 676–734; and 61, pages 870–899. That the original observations of Tissier concerning the predominance of L. bifidus in nurslings' stools have been amply confirmed is pointed out in the more recent publications of Norris, Flanders, Tomarelli, and György in the Journal of Bacteriology, 60, pages 681–696 (December 1950).

Medical authorities are now in general agreement that many of the advantages which a breast-fed infant seems to have, in so far as its nutrition and resistance to certain diseases are concerned, are attributable, at least in part, to the predominance of L. bifidus in his intestinal tract. The prevalence of this organism in the intestinal tract is now believed to be of physiological significance, and its growth may prevent intestinal disorders caused by other bacteria. Resistance to bacterial intestinal diseases, and even to parenteral disorders, such as respiratory infections, is typical of breast-fed infants. Infants who are bottle-fed with the milk of cows and other animals, or with infant feeding formulas utilizing cow's milk as the source of protein, are definitely more susceptible to such disorders. In this connection see the article of Robinson in "Lancet," entitled: "Infant morbidity and mortality," vol. CCLX, page 788 (April 7, 1951).

In the infant colon in which a stable L. bifidus flora is lacking, it is now generally believed that the infant is more likely to suffer from disorders attributable to the growth of other bacteria some of which are harmful to the infant, since competition for the available food supply in the infant intestinal tract where L. bifidus flourishes reduces the possibility that other bacteria, particularly the harmful B. coli, may grow in considerable numbers or in extensive colonies.

In any event, where the gram-positive bacillus L. bifidus is present in large numbers in the infant intestine, which is now found only when the infant is breast-fed, there is considerably less growth of other microorganisms, particularly of the gram-negative B. coli, the Clostridia, and of certain air-born microorganisms such as the Sarcinae bacteria. While the reasons for the superior resistance to disease of breast-fed infants as compared with infants who are fed on cow's milk, or on the usual infant formulas in which cow's milk is a principal constituent, are not fully understood pediatricians are generally agreed that in some measure, at least, the superior resistance is attributable to the presence of an extensive L. bifidus flora in the intestines of nurslings, this bacterium being absent in any considerable numbers from the intestines of infants who are not fed with human milk. Interest in the isolation and determination of the growth requirements of L. bifidus and, in particular, of the growth-promoting principles which are essential for the growth of such strains as L. bifidus var. Penn. which will not satisfactorily grow without these principles, has therefore been stimulated by its apparently unique predominance in the intestinal tract of the breast-fed infant.

Extensive work has been carried out on the identification and isolation of the active biological principle which is responsible for promoting the growth of L. bifidus in the intestines of infants who are nourished with human milk, which active principle is evidently not present in sufficient amount to insure the growth of L. bifidus as the predominant microorganism in the intestinal tract of infants who are fed with cow's milk, or with any of the usual feeding compositions or infant formulas based on cow's milk. This work has demonstrated that the growth-promoting factor is also present in cow's milk as well as in human milk, but it is present in cow's milk in such small amounts as to be insufficient to supply to infants fed with cow's milk enough of the growth-promoting factor for L. bifidus to cause that organism to predominate in the intestinal bacterial flora of the infant.

While the concentration of the growth-promoting factor for L. bifidus in cow's milk varies to some extent with various samples of milk, and to some extent with the particular strain or variety of the L. bifidus microorganism which is selected for the test, ordinarily the growth-promoting factor is present in cow's milk only in about $\frac{1}{30}$ the concentration (approximately 3.33%) in which it is present in human or breast milk. In this concentration it is evidently present in too small an amount to insure that L. bifidus will be the predominating microorganism in the intestinal flora of infants fed with cow's milk. It should be noted that only about one-half of the solid content of the commercial infant food preparation of which the analysis is given above is cow's milk, and the L. bifidus growth-promoting factor is present in such an infant food formula only to the extent of approximately $\frac{1}{60}$ (approximately 1.67%) of the amount in which it is present in an equal volume of human milk.

While the advantages of supplying the feeding infant with a food composition suitable for promoting the growth of L. bifidus as the predominating microorganism in the infant colon have been appreciated for some time, it has not been possible to attain this with any of the presently available food compositions wherein the growth-promoting factor, on an average, has been present only to the extent of approximately 1.67% of the amount in which it is present in human milk as compared on an equal volume basis. From time to time thought has been directed to the possibility of adding to infant food compositions some material or substance which would supply the L. bifidus growth-promoting factor in greater amount, so that this growth-promoting factor could be present in the infant's nourishment to an extent sufficient to insure the predominance of the microorganism L. bifidus in his intestinal tract. Unfortunately, however, until comparatively very recently, no substance other than human milk has been known to contain the growth-promoting factor in sufficiently high concentration to permit the enhancement of the growth-promoting factor content to an extent adequate to insure this result with the presently available commercial preparations, and human milk is not of course a practical additive to such formulas.

We have now discovered that certain chemical compounds which may be readily prepared from N-acetyl-d-glucosamine (2-desoxy-2-acetamino-d-glucose), or in other ways, possess high activity in promoting the growth of Lactobacillus bifidus, and especially those strains of L. bifidus such as L. bifidus var. Penn. which require the presence of the growth-promoting factor or factors in order that they may grow at all. These chemical compounds (some of which are new and have not been previously prepared) which contain the essential growth-promoting principle for L. bifidus are the $\alpha$- and $\beta$-alkyl glucosides of N-acetyl-d-glucosamine, and more particularly the $\alpha$- and $\beta$-lower alkyl glucosides of N-acetyl-d-glucosamine. Among specific $\alpha$- and $\beta$-alkyl glucosides which we have found to possess the growth-promoting activity for L. bifidus to a very considerable extent, and to be useful for supplying the essential factor to food and therapeutic compositions in which it is incorporated, are the $\alpha$-methyl glucoside of N-acetyl-d-glucosamine, the $\beta$-methyl glucoside, the $\alpha$-ethyl glucoside and the $\alpha$-isopropyl glucoside, all of said glucosides being glucosides of N-acetyl-d-glusosamine. We have found that there are some of these $\alpha$- and $\beta$-lower alkyl glucosides of N-acetyl-d-glucosamine which are more active biologically in promoting the growth of Lactobacillus bifidus, and especially the growth of L. bifidus var. Penn., than is N-acetyl-d-glucosamine itself (2 - desoxy - 2 - acetamino-d-glucose). These $\alpha$- and $\beta$-alkyl glucosides are therefore more effective than N-acetyl-d-glucosamine for promoting the growth of L. bifidus when incorporated in food preparations and in compositions possessing therapeutic activity as an ingredient thereof. These food and therapeutic compositions containing one or more $\alpha$- and $\beta$-lower alkyl glucosides of N-acetyl-d-glucosamine as an additive, when ingested by infants and other persons or by animals will promote the growth of Lactobacillus bifidus in the intestinal tracts, and these improved food and therapeutic preparations, containing the biologically active additives, constitute our invention.

The growth-promoting activity of a material may be expressed as the number of micrograms of the material which are necessary to give a standard response, E, when tested with various strains of L. bifidus, such as L. bifidus var. Penn., which response E is that given by 0.06 milliliters of human (breast) milk of average growth-promoting activity or content of the growth-promoting factor. (The growth-promoting activity for L. bifidus of breast milk varies to some extent, and the standard unit, E, is based on average conditions.)

The growth-promoting activity of N-acetyl-d-glucosamine is 2000–3000 micrograms/E; as from 2000–3000 micrograms are necessary to give the standard growth response, E, and this is usually expressed in this way, i. e. 2000–3000 micrograms/E. We have found that the growth-promoting activity of at least some of the α- and β-lower alkyl glucosides of N-acetyl-d-glucosamine is considerably higher than that of N-acetyl-d-glucosamine itself. For example, the α-methyl glucoside of N-acetyl-d-glucosamine has an activity of approximately 240 micrograms/E., and the β-methyl glucoside of N-acetyl-d-glucosamine is approximately as active as the α-compound (within the limits of error of our tests). This activity is, therefore, approximately ten times that of N-acetyl-d-glucosamine itself, and it is indeed remarkable that the glucosides are so much more active in promoting the growth of *L. bifidus*, especially such strains as *L. bifidus* var. Penn. as is N-acetyl-d-glucosamine itself.

The additives which we incorporate in food compositions, particularly infant food compositions of the type previously described, and in compositions possessing therapeutic activity, are readily prepared by available processes. The α-alkyl glucosides of N-acetyl-d-glucosamine are readily prepared by reacting N-acetyl-d-glucosamine and an anhydrous alcohol in the presence of an acid catalyst which will not attack the acetylamino group of the N-acetyl-d-glucosamine, this acid catalyst being, preferably, a cation exchange resin, and the reaction being carried out either by refluxing at the boiling point of the alcohol, or by agitation for several hours at room temperature. This process, and the novel α-ethyl glucoside and α-isopropyl glucoside of N-acetyl-d-glucosamine which can be prepared in this way are the subject matter of our copending application filed concurrently herewith, Serial No. 290,326, filed May 27, 1952. The β-methyl glucoside of N-acetyl-d-glucosamine may be prepared by the method described by Neuberger and Rivers, Jour. Chem. Soc., London, 1939, page 123.

The biological activity of some additional α-alkyl glucosides as determined by tests against the strain *L. bifidus* var. Penn. are as follows:

|   | Micrograms/E |
|---|---|
| α-Ethyl glucoside of N-acetyl-d-glucosamine | 1400 |
| α-Isopropyl glucoside of N-acetyl-d-glucosamine | 2400 |

We have found that the amount of the α- or β-alkyl glucoside of N-acetyl-d-glucosamine, such as the α- or β-methyl, α-ethyl, or α-isopropyl glucoside of N-acetyl-d-glucosamine, which should be incorporated in an infant feeding formula or therapeutic composition, either for infants or for persons of any age, where that formula or composition is based on or derived from cow's milk and is of the general type previously described, may range from about 0.5% to 5.0% by weight, this percentage being based on the total weight of solids present in the infant feeding formula or therapeutic composition. Frequently an amount of α- or β-alkyl glucoside of N-acetyl-d-glucosamine not exceeding about 1.0% will be found satisfactory for many purposes in infant feeding and in therapeutic compositions. Ordinarily when the composition of foodstuff is used as an animal feed, or as a constituent in animal feeds, an amount of not over about 1.0% of the α- or β-alkyl glucoside of N-acetyl-d-glucosamine will be entirely satisfactory.

The addition of an α- or β-alkyl glucoside of N-acetyl-d-glucosamine, such as α- or β-methyl, α-ethyl, or α-isopropyl glucosides of N-acetyl-d-glucosamine, to such a composition in amounts within the range 0.5% to 5% by weight thereof, based on the solids content of the composition, supplements the small amount of *L. bifidus* growth-promoting factor of factors already present in that composition as a result of the cow's milk content thereof so that the quantity of growth-promoting principle, as supplemented, is approximately comparable with or greater than the amount occurring, on the average in an equal volume of human (breast) milk. When infants or aged persons are fed with this composition or formula, the protein content thereof being derived from cow's milk and the content of growth-promoting factor or factors supplemented by the addition of an α- or β-alkyl glucoside of N-acetyl-d-glucosamine thereto, all strains of the *L. bifidus* microorganisms, including *L. bifidus* var. Penn., will grow in the intestinal tracts of persons fed therewith, since the composition provides a source of nutriment which is, as respects the amount of *L. bifidus* growth principle present therein, substantially equal to human milk or superior thereto. The *L. bifidus* microorganism is thus able to grow and proliferate to the same extent that it would if the infant or aged person were fed with human milk.

While we prefer to add to food compositions based on cow's milk as utilized for infant feeding or in geriatrics amounts of an α- or β-alkyl glucoside of N-acetyl-d-glucosamine, such as the α-methyl, β-methyl, α-ethyl and α-isopropyl glucosides, ranging from approximately 0.5% to 5% by weight, based on the solids content of the composition, the quantity that need be added to secure satisfactory supplementation of the *L. bifidus* growth-promoting factor is not unduly critical and may be varied within wide limits. The amount of added α- or β-alkyl glucoside of N-acetyl-d-glucosamine may therefore, depending on requirements, vary by considerable percentages. Also, of course, it is possible to utilize infant food compositions and compositions possessing health value or therapeutic activity for persons who are not infants, which contain less than that concentration of growth-promoting factor which is present in human milk. In such cases the amount of the α-alkyl glucoside or β-alkyl glucoside of N-acetyl-d-glucosamine added may be somewhat less than the minimum percentage given as the lower limit of the illustrative range specified.

While we have referred herein to food compositions based on cow's milk and intended for infant feeding, or for feeding aged or elderly persons, as illustrative, our compositions are also valuable as animal foodstuffs or as ingredients of animal feeds. Thus, our invention also includes preparations intended for feeding young animals, such as synthetic pig's milk, or bitch's milk, or for feeding other animals, which compositions contain, as an ingredient thereof, an α-alkyl glucoside or β-alkyl glucoside of N-acetyl-d-glucosamine.

Various modifications of this invention will be apparent to those skilled in the art, and to the extent that these modifications are within the scope of the appended claims they are to be considered as part of our invention.

We claim:

1. A composition comprising cow's milk solids and an additive selected from the group consisting of the α- and β-alkyl glucosides of N-acetyl-d-glucosamine.

2. A composition comprising cow's milk solids and a lower alkyl glucoside of N-acetyl-d-glucosamine selected from the group which consists of the α-methyl glucoside, the β-methyl glucoside, the α-ethyl glucoside, and the α-isopropyl glucoside of N-acetyl-d-glucosamine.

3. A composition comprising cow's milk solids and from 0.5% to 5% by weight of α-methyl glucoside of N-acetyl-d-glucosamine, said percentages being by weight, based on the solids content of said composition.

4. A composition comprising cow's milk solids and from 0.5% to 5% by weight of β-methyl glucoside of N-acetyl-d-glucosamine, said percentages being by weight, based on the solids content of said composition.

5. A composition comprising cow's milk solids and from 0.5% to 5% by weight of α-ethyl glucoside of N-acetyl-d-glucosamine, said percentages being by weight, based on the solids content of said composition.

6. A composition comprising cow's milk solids and from 0.5% to 5% by weight of α-isopropyl glucoside of N-acetyl-d-glucosamine, said percentages being by weight, based on the solids content of said composition.

References Cited in the file of this patent

UNITED STATES PATENTS

| | | |
|---|---|---|
| 1,607,844 | Nielson | Nov. 23, 1926 |
| 2,374,407 | Block et al. | Apr. 24, 1945 |
| 2,463,885 | Kuehl, Jr., et al. | Mar. 8, 1949 |
| 2,538,106 | Kuehl, Jr. | Jan. 16, 1951 |

OTHER REFERENCES

"The Role of Lysozyme in the Development of the Intestinal Flora of the New-Born Infant," by Rosenthal et al., reprinted from the Journal of Infectious Diseases, February 1931, vol. 48, pages 226–235, American Medical Association Press, 535 North Dearborn St., Chicago, Illinois.

"The Enzymes," by Sumner et al., vol. 1, part 2, Academic Press Inc., New York, 1951, pages 772, 785 and 790.

Neuberger: Chem. Abstracts, vol. 35, 3978 (1941).